(12) United States Patent
Achari et al.

(10) Patent No.: US 8,122,496 B2
(45) Date of Patent: Feb. 21, 2012

(54) SECURE DISPLAY METHOD AND DEVICE

(75) Inventors: Karim Achari, Montgeron (FR); Ronan Loheac, Piscop (FR)

(73) Assignee: Compagnie Industrielle et Financiere d'Ingenierie "Ingenico", Neuilly-sur-Seine (FR)

( * ) Notice: Subject to any disclaimer, the term of this patent is extended or adjusted under 35 U.S.C. 154(b) by 996 days.

(21) Appl. No.: 12/059,412

(22) Filed: Mar. 31, 2008

(65) Prior Publication Data

US 2008/0316357 A1    Dec. 25, 2008

(30) Foreign Application Priority Data

Mar. 30, 2007  (FR) ...................................... 07 02333

(51) Int. Cl.
*G06F 7/04* (2006.01)
(52) U.S. Cl. ................................. 726/17; 726/16; 726/2
(58) Field of Classification Search .................... 726/17, 726/16, 2
See application file for complete search history.

(56) References Cited

U.S. PATENT DOCUMENTS

| 4,899,136 | A | 2/1990 | Beard et al. ................... 340/706 |
| 5,075,884 | A | 12/1991 | Sherman et al. ............... 395/650 |
| 2004/0226041 | A1 | 11/2004 | Smith et al. ..................... 725/43 |

FOREIGN PATENT DOCUMENTS

EP    1 526 424 A    4/2005

OTHER PUBLICATIONS

Testing the Symbian OS Platform Security Architecture; Badura, T.; Becher, M.; Advanced Information Networking and Applications, 2009. AINA '09. International Conference on Publication Year: 2009 , pp. 838-844.*
A Design of Trusted Operating System Based on Linux; Li Hongjuan; Lan Yuqing; Electrical and Control Engineering (ICECE), 2010 International Conference on Publication Year: 2010 , pp. 4598-4601.*
Operating System Security and Host Vulnerability Evaluation; Jihong Song; Guiying Hu; QuanSheng Xu; Management and Service Science, 2009. MASS '09. International Conference on; Publication Year: 2009 , pp. 1-4.*
French Search Report from counterpart foreign Application No. FR 07/02333, dated Jan. 14 , 2008.

* cited by examiner

*Primary Examiner* — David Y Jung
(74) *Attorney, Agent, or Firm* — David D. Brush; Westman, Champlin & Kelly, P.A.

(57) ABSTRACT

A secure display device is designed to display on a screen a first set of information edited by an open operating system. A secure operating system resident in a dedicated circuit edits a second set of information. A filter allocates, independently of the open operating system, a first zone of the screen to the first set of information and a second zone of the screen to the second set of information. The zones and can have a non-zero intersection and any value. A real video memory is used for transferring the two sets of information to the screen under the sole control of the secure operating system so as to produce a secure display of the second set of information.

15 Claims, 5 Drawing Sheets

SECURE DISPLAY METHOD AND DEVICE

CROSS-REFERENCE TO RELATED APPLICATIONS

None.

FIELD OF THE DISCLOSURE

The present disclosure concerns the equipment used for performing actions that involve or relate to objects of a confidential nature. By way of illustration, payment actions that involve a bank account number or that relate to the entry of a confidential code or to an amount to be debited or credited can be cited. Other actions can be cited such as for example actions, of a medical or civil nature, that relate to biological or patrimonial data particular to an individual.

BACKGROUND OF THE DISCLOSURE

The natural tendency is preferably to trust equipment particularly armoured against various intrusions or attacks. This can be achieved at various levels. At the level of the physical constitution of the equipment, this can be in a tamper-proof box, resistant to intrusion (tamper resistant), or leaving a visible trace of any attempt at sabotage (tamper evidence), or affording a response adapted to a detection of intrusion (tamper responsive). At the level of the functional constitution, the sensitive data are generally enciphered and their processing is subject to cryptographic protocols. A correct degree of security is obtained by using solely electronic circuits etched in the mass. A minimum of precautions is to be taken if it is wished to improve the flexibility of use of the equipment. It is normally preferred to use software components able to be used by means of secure operating systems inaccessible to third parties.

The flexibility of use offered by the equipment disclosed above remains limited. In a world containing a vast amount of various items of electronic equipment such as mobile telephones, personal assistants or microcomputers, a comparable need for flexibility is felt for equipment intended to be used for performing actions that involve or relate to objects of a confidential nature. It is known that the operating systems commonly referred to as open because of their wide distribution offer an appreciable abundance of useful and user-friendly applications that it would be advantageous to be able to use to satisfy this requirement. This opening up to other software applications than those strictly protected have the drawback of putting security in jeopardy. Thus a malevolent application or one contaminated by malevolent execution sequences could spy on and betray the security processes of the equipment.

There exist solutions that consist of systematically authorizing only duly signed applications, to be executed in the equipment. The well known mechanism of signatures generally involves certificates checked by trustworthy bodies to guarantee the integrity of the signed application. This type of solution in fact restricts the quality of opening up of the operating system preventing also execution of applications that are not necessarily malevolent and that it would be agreeable not to be deprived of.

There also exist solutions that consist of making the equipment function in two different modes, a completely open mode and a secure mode that is reserved for security applications such as those for performing actions that involve or relate to objects of a confidential nature.

The use of an open operating system is generally accompanied by that of a graphical screen for displaying various items of information. Such a screen offers a possibility of particularly expressive display of the mode, secure or otherwise, in which the equipment is situated. In order to inform a user of the equipment of the active mode, an indicator light would have the drawback of having to educate the user on the attention to be paid to this indicator light and on the interpretation to give to it in order to distinguish open mode from secure mode. It may also be thought of displaying a pictogram, associated or not with a text in the language of the user. However, such a type of display poses a problem of compatibility, in terms of security, with an opening offered to any application. In open operating mode of the terminal, a malevolent application could corrupt the display so as to deceive the user by displaying a secure mode in which the terminal is not situated. An absence of certainty about the mode in which the terminal is situated presents a considerable drawback.

It would be possible to think of using two screens, one for open mode and one for secure mode. Apart from the drawbacks caused in terms of costs and size, this solution would require the user to survey two different screens. This solution would also be vulnerable to certain attacks consisting of putting a shield on the screen allocated to secure mode so as to deceive an uninformed user by displaying a false secure mode on the screen attributed to open mode.

SUMMARY

An aspect of the present disclosure relates to a method of secure display on a screen designed to display a first set of information edited by a first operating system. This method comprises a filtering step in which an element allocates, independently of the first operating system, a first zone of the screen to the first set of information and a second zone of the screen to a second set of information edited by a second operating system. The filtering step is combined with a real display step in which the two sets of information are transferred to the screen under the exclusive control of the second operating system so as to produce a secure display of the second set of information.

According to preferred embodiments, the method comprises one or more of the following characteristics:

The first operating system is an open operating system and the second operating system is a secure operating system.

In a virtual display step, the first set of information is written in a virtual video memory under the control of the first operating system and the content of which is accessible to the second operating system.

According to an alternative, in a virtual display step, the first step of information is written in a real video memory under the control of the first operating system so as to be able to combine the first video signals that result therefrom with second video signals that result from the second set of information under the control of the second operating system.

The secure operating system is hosted in a hardware component that isolates the open operating system in terms of direct access to the screen.

The second zone is situated on the screen at a first position easily identifiable by a user.

The first position is alternately permuted with a second position previously covered by the first zone.

The second zone is superimposed with or without transparency on the first zone at one or more positions on the screen.

At least one of said positions is moving on the screen.

A device for secure display on a screen designed to display a first set of information edited by a first operating system comprises a filter arranged to allocate, independently of the first operating system, a first zone of the screen to the first set of information and a second zone of the screen to the second set of information edited by a second operating system and for transferring the two sets of information to the screen under the sole control of the second operating system so as to produce a secure display of the second set of information.

In particular the first operating system of the device is open and the second operating system of the device is secure.

The filter comprises at the input a virtual video memory arranged to receive the first set of information under the control of the first open operating system and at the output a real video memory for combining the two sets of information.

The filter is arranged to receive first video data generated by a standard processor and second video data generated by a secure processor, and to transfer into a video memory a combination of the first and second video data.

The filter is arranged to receive first video signals coming from a first video controller and second video signals coming from a second video controller, and to transfer onto the screen a combination of the first and second video signals.

The filter is arranged to place the second zone on the screen at a first position easily identifiable by a user.

The filter is arranged to permute said first position alternately with a second position previously covered by the first zone.

The filter is arranged to superimpose with or without transparency the second zone on the first zone at one or more positions on the screen.

The filter is arranged to make at least one of said positions move on the screen.

BRIEF DESCRIPTION OF THE DRAWINGS

Other characteristics and advantages will emerge from a reading of the following description of a preferred embodiment given by way of example and with reference to the accompanying drawing.

DETAILED DESCRIPTION OF ILLUSTRATIVE EMBODIMENTS

A description will now be given of an example of implementation of a device for secure display on a screen designed to display a first set of information edited by a first operating system. There will be noted in the device a filter arranged to allocate, independently of the first operating system, a first zone of the screen to the first set of information and a second zone of the screen to a second set of information edited by a second operating system and to transfer the two sets of information to the screen under the sole control of the second operating system so as to produce a secure display of the second set of information.

Figure 1:
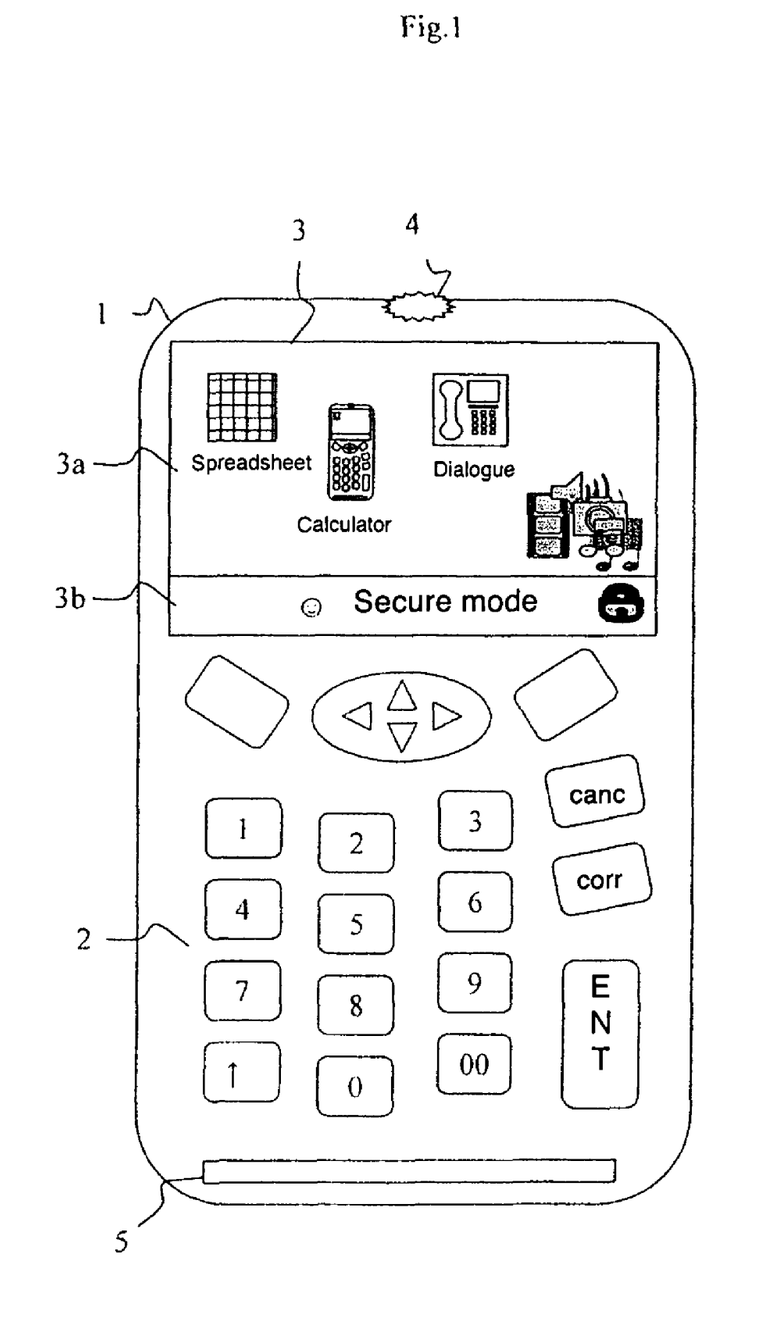
FIG. 1 depicts schematically an example of a terminal in which it is useful to implement an embodiment of the invention.

With reference to FIG. 1, a payment terminal 1 comprises a keyboard 2, a screen 3, a communication coupler 4 and a chip card, magnetic card or contactless card reader 5. A payment terminal also comprises other elements not shown here such as for example a printer. The screen 3 is advantageously equipped with a touch pad that makes it possible to perform numeric key functions similar to those of a keypad by pressing on a point on the screen marked by a particular image.

For example, a user introduces his chip card into the reader 5 through a slot, looks at a transaction amount displayed on the screen 3 and, if he is in agreement with paying this amount, enters his PIN code by entering the figures on the keys on the keypad and validating this code by means of a key provided for this purpose. The terminal then checks the validity of the code by dialoguing with the chip and debits the account of the user by dialoguing in addition with a remote server, not shown, by means of the communication coupler 4. The communication coupler 4 is of a cabled nature such as is sometimes encountered at the tills in large stores or of a wireless nature by means of example of electromagnetic waves.

In the case of a mobile telephone, a chip resident in the telephone and a communication coupler 4 consisting of its normal antenna, an embodiment of the invention is advantageous for warding against malevolent applications that might send a confidential code of the user, for example by text message (SMS).

It is advantageous to equip the terminal 1 with an open operating system. The term "open" is to be taken in its widest sense commonly adopted in the user world. In other words, the term of course designates truly open operating systems such as the original UNIX and LINUX systems. Here the term "open" also designates systems that are widely available commercially such as for example different versions of Microsoft Windows™. Although the source programs of the core and many primitives of such operating systems remain under the control of the proprietor, common sense attributes the term "open" to them since sufficient accesses to the operating system are widely disseminated. This wide dissemination makes it possible to develop many applications and many hardware platforms that appreciably enhance the availability of product materials and that in some way establish a wide collectivity of users and develop developers who share common environments. At the present time such operating systems have adopted the habit of developing graphical interfaces prized for their user friendliness and flexibility. It is then possible to integrate accesses to so-called commercial applications as depicted in FIG. 1, a spreadsheet, a calculator, a telecommunication application or various multimedia applications. However, the opening of such operating systems to numerous applications has the counterpart of also offering access to malevolent applications such as spy software or other unpleasant viruses.

So as to make it possible to acquire, process and communicate sensitive data by display or transmission without having to fear interference by a malevolent application, the equipment goes into secure mode, which it displays on a banner or pictogram. The function of the banner or pictogram is to indicate the mode, secure or non-secure, in which the terminal is situated. Here the banner is for example displayed at the bottom of the screen 3, which constitutes a position easily identifiable by the user. Other easily identifiable positions exist, for example at the top, at the right, or the left or moving from top to bottom of the screen 3. Types of sensitive data in the case of a payment terminal include of course the account data and the bankcard code. It is possible also to think of other types of data such as non-limitatively medical, biometric or social data.

There exist many advantages in displaying a band, banner or other graphics on the screen rather than switching an indicator light on or off, possibly in different colours. The indicator light risks being easily masked. Moreover, the indicator light would require the user to know the meanings thereof without ambiguity whereas on a band it suffices to inscribe a clear text "secure mode" or "non-secure mode" possibly adorned with known signs such as an open or closed padlock. An on-screen display is not fixed, the language or size of font can be adjusted according to the users. Moreover, the users, habituated to directing their gaze onto the screen, find a convenient environment that prevents them distracting their gaze towards other places on the equipment. By virtue of the protection offered by an embodiment of the invention, the modularity that has just been disclosed can be used with a highly appreciably degree of security.

Figure 2:
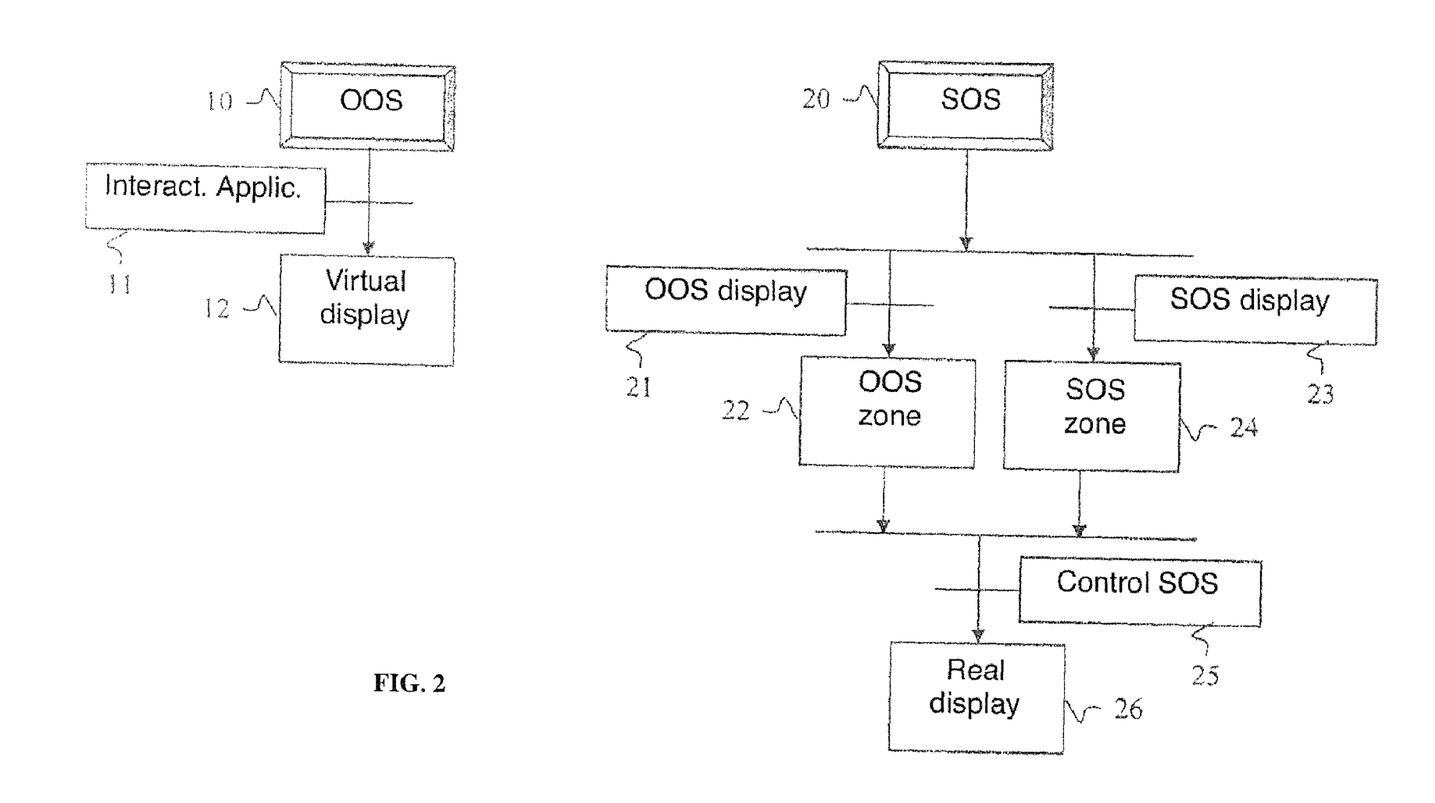
FIG. 2 depicts steps of the method according to an embodiment of the invention.

With reference to FIG. 2, preferred steps for implementing a method for secure display on a screen designed to display a first set of information edited by a first operating system are now explained. A filtering step will be noted in which an element allocates, independently of the first operating system, a first zone of the screen to the first set of information and a second zone of the screen to a second set of information edited by a second operating system. The filtering step is combined with a real display step in which the two sets of information are transferred to the screen under the sole control of the second operating system so as to produce a secure display of the second set of information.

In this way, the second operating system can be an obstacle to corruption of the display of the second set of information by an application executed in the environment of the first operating system.

To implement the method, a screen is used such as the screen 3 normally provided for displaying a set of information edited by an open operating system. This information results from applications that are installed to use the resources of the operating system where, as seen previously, the term "open" relates essentially to the fact that sufficient components are disseminated to make it possible to develop a wide range of applications which, often in the absence of evaluation from the point of view of security, offer no guarantee with regard to the use that they make of resources of the system. One advantage however is that the display of the information benefits from graphics familiar to the user and allows many interventions by the user by means of the keyboard 2 or touch characteristics of the screen itself.

In a usual step 10, the open operating system (OOS) is listening out permanently for various interruptions or interactions of software or hardware origin. The interactions of hardware origin are those that concern peripherals, in the wide sense, catalogued by a program normally triggered when the operating system is launched and called BIOS, the acronym for "basic input output system" in order to express "basic input output system".

A transition 11 validated at each interaction of an application for displaying information activates a step 12. Step 12 is generally executed by a display driver installed with the OOS. Normally, the display driver transcribes the information received in a video memory periodically scanned by a screen control circuit. So as to prepare the following steps of the method, the display driver of the OOS is configured to transcribe the information received in a virtual video memory.

The virtual video memory is for example simply a reserved zone of the memory controlled by the OOS towards which the display driver of the OOS parameterized for this purpose reroutes the data to be displayed. So as to be able to execute the filtering step, the content of the virtual memory is made accessible at least in read mode to the secure operating system. In step 12, the display under the control of the OOS is then virtual in nature. In contradistinction to a real display where the image reproduced on the screen is the one actually generated under the control of the OOS, in the case of a virtual display an image is not reproduced on the screen as generated. Another way of preparing the following steps of the method is to configure the display driver in order to transcribe the information received in a real video memory connected to a video controller. Contrary to the custom where the video controller is connected to the screen, the video controller is connected to a component for processing the information so that, in step 12, the display under the control of the OOS is here also virtual in nature.

In a step 20 independent of the OOS, a secure operating system (SOS) is listening out permanently for various interruptions or interactions of software or hardware origin. The SOS is distinguished from the OOS in that its microprogram (firmware) is of restricted and controlled distribution. It is possible to obtain a secure system by using a proprietary system or an open basic system but surmounted by a software layer that isolates the system from application accesses. The degree of security offered by the SOS will be appreciated since a development of applications adapted to the SOS requires belonging to a limited circle of authorized persons and using specific or adapted development tools.

In a filtering step, the secure operating system allocates, independently of the open operating system, in a substep 22, a first zone of the screen to the first set of information and in substep 24 a second zone of the screen to a second set of information edited by the secure operating system.

The substep 22 is activated by a transition 21 validated by the reception of the display data coming from the OOS and the substep 24 is activated by a transition 23 validated by the reception of the display data coming from the SOS.

If for example the screen 3 has a display surface of 640 pixels by 480 pixels, a reduced display surface of 640 pixels by 455 pixels is allocated to the zone 3a and this reduced surface value is communicated to the OOS as being the total display surface available. The remaining display surface of 640 pixels by 25 pixels is then allocated to the zone 3b without the OOS having knowledge of this. Naturally the values given above are given only by way of illustration and it will be understood that the implementer of the invention remains free to choose any other values. As will be seen subsequently, it is also possible to allocate all the surface of the screen to the zone 3a and to allocate screen parts not necessarily related to the zone 3b.

A real display step 26 is activated by a transition 25 validated under the exclusive control of the secure operating system. In step 26 the two sets of information are transferred to the screen so that the second set of information is displayed in a secure fashion.

So as to improve the security of the method, the secure operating system is advantageously hosted in a hardware component that isolates the open operating system in terms of direct access to the screen.

The situation of each of the zones on the screen results from an addressing in real video memory carried out at step 26. Taking the numerical example mentioned above simply in order to illustrate the argument, the second set of information is for example addressed to the first lines of the real video memory, which corresponds to the 640 by 25 pixels of the bottom of the screen and the first set of information is then addressed to the following lines of the real video memory, which correspond to the 640 by 455 pixels of the top part of the screen. Thus the situation of the second zone in this first position at the bottom of the screen is easily identifiable by a user.

In a case where the virtuality of the display is obtained not by the rerouting of the image information at the input of the video memory but by rerouting at the output of the video controller, action is taken not on the addresses but on the signals that are used for the refreshing of the screen, typically the clock signals, the control signals and/or the data signals.

No malevolent application that uses the resources offered by a first operating system, here the open operating system, can access the second zone, which is reserved for a second operating system, here the secure operating system. The result is good qualities of credibility on the content displayed in the second zone.

In a first preferred embodiment, the display method is improved in order to combat against any attack that would consist of covering the bottom of the screen with an adhesive tape or any other means and then launching a malevolent application that would display a false band at the bottom of the first zone so as to deceive the user. The improvement consists of permuting alternately the first position with a second position previously covered by the first zone. This can be achieved for example by reversing the order of addressing in the real video memory. This is able to discourage fraudsters since now obscuring the top and bottom of the screen would result in a considerably reduced useful display surface. In addition, the movement of the first zone that results from the permutation would have the effect of masking alternately one part of this zone. In order to avoid unnecessarily fatiguing the user with a movement of the security band, it is possible to provide a frequency with a fairly low half cycle ranging from one minute to a week but preferentially random or pseudo-random and consequently unpredictable for a fraudster. Likewise the half cycle of the positions on the screen is not limited at the top and bottom but can also follow in a random or circular manner any side at the periphery of the screen either on the left or on the right or at the top or bottom.

In a second preferred embodiment, the improvement consists of not restricting the size of the first zone in comparison with that of the screen. The second zone is then displayed transparently overlapping on one or more points on the first zone. This makes it possible to have available the greatest extent for displaying the image generated under the control of the OOS. This also offers more possibilities for displaying the image generated under the control of the SOS. It is possible for example to make a banner move from top to bottom of the screen in order to indicate the security mode applying or to make one or more pictograms move at different points on the screen. A degree of transparency can be modulated by means of coefficients whose parameterizing ranges from a glow to total obscuring (absence of transparency). The zones (3a) and (3b) can thus have a non-zero intersection of any value.

Figure 3:
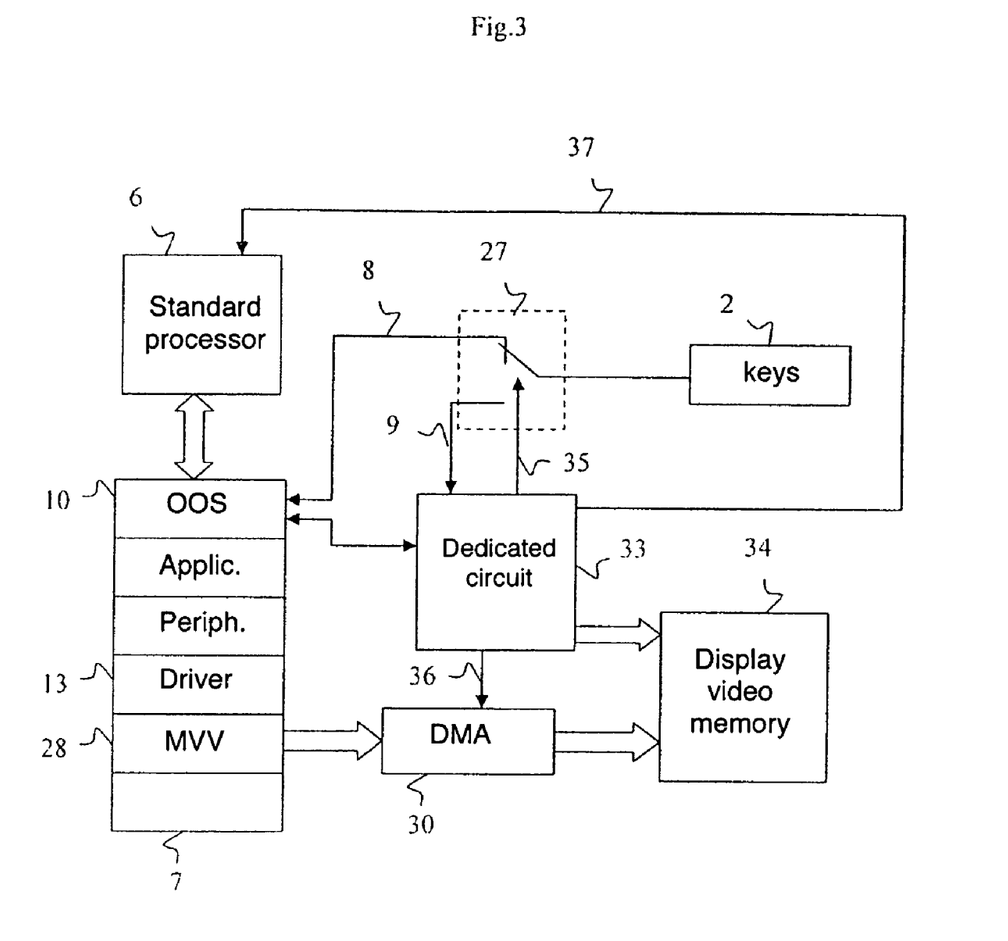
FIG. 3 depicts a first diagram of a device according to an embodiment of the invention.

With reference to FIG. 3, electronic equipment such as the terminal 1 of FIG. 1 comprises a memory 7 wholly or partly of the random access memory type and a standard processor 6, that is to say a processor commercially available. The commercial availability of the documentation generally accompanying the processor does however make possible to study its vulnerabilities to the prejudice of security. The processor 6 is wired with the memory 7 so as to be able to process the data stored therein. The term "data" is to be taken in its widest sense and can designate both an address, a control register or an instruction, or a variable quantity.

A dedicated circuit 33, for example of the integrated circuit type for specific application (ASIC, the acronym for Application Specific Integrated Circuit) or a combination of specific and/or standard integrated circuits, uses a secure operating system. Mechanisms not described here can make it possible to detect hardware or software modifications of the OOS or to ensure functioning in accordance with what is expected for the SOS. By way of example, the secure operating system (SOS) is for example microprogrammed in the dedicated circuit 33 itself or in a rewritable etched memory (not shown) physically connected to the dedicated circuit 33. The SOS controls the signal reinitializing the processor 6 so as to block it in the event of detection of an attack. The dedicated circuit 33 moreover accesses a test access port bus 37, for example of the JTAG type (the acronym for Joint Test Action Group) wired to the processor 6. Access from the circuit 33 to the bus 37 enables the SOS to install and launch an open operating system (OOS) core 10 in memory 7 in order to be executed by the processor 6. The bus 37 is also used by the SOS in order to authenticate the core of the OOS on booting. The OOS for its part is configured to validate if necessary signatures of applications loaded in memory 7. In the event of detection of an attack on the OOS, it is for example possible to allow the SOS to cease sharing with the OOS so as to take complete control of the display, or even to neutralize the OOS or to reload a default version of the OOS. This further increases the security of use.

The memory 7 also contains peripheral drivers to enable the OOS to control peripherals of lesser sensitivity such as the power management, audio properties or a serial link, possibly sharing some with the SOS if necessary, for example wireless connections 4, an Ethernet coupler or the display on the screen 3 with regard to which additional information will be given in the remainder of the description.

The most sensitive peripherals such as for example the card reader 5, a biometric detector if such exists, numeric keys on the keypad 2 or on the touch screen 3, are under the sole control of the SOS. The SOS also controls other peripherals, sharing some with the OOS; these are for example a printer, functional keys on the keypad 2, a modem or the backup battery.

The dedicated circuit 33 has a command 35 for switching, by means of a switch 27, the data exchanged with a touch pad combined with the screen or possibly certain keys on the keypad 2, either to a link 8 to the OOS or to a link 9 to the SOS. In FIG. 3 the link 9 is connected to the dedicated circuit 33 for the case where the latter hosts the SOS.

A possible alternative to the hardware architecture described with reference to FIG. 3 can be achieved functionally by hosting the SOS in memory 7. It is then preferable in this case to give the SOS a highly secure control of the memory 7, for example by means of a protective structure in rings on a model similar to that taught by the patent EP 0208199 B1 or by means of memory management unit (MMU, standing for memory management unit). According to this alternative, the switch 27 can be produced in software form in a security layer of the SOS.

Control of the touch pad is requisitioned by the SOS on detection of an event that may take place on switching into secure mode such as for example an introduction of a chip card in the reader 5 or a passage of a magnetic strip card. It should be noted that it is not necessary to introduce the card into a slot as for example in the case of a contactless card. According to the technology employed, different variants are envisaged to enable the SOS to requisition the touch pad. It is possible to cite a permanent control of the touch pad by the SOS, including in non-secure mode, during which the SOS then purely and simply retransmits the signals coming from the touch pad to the OOS. This permanent control then enables the SOS to no longer transmit the signals to the OOS in secure mode. A switching of the touch pad to the OOS in non-secure mode and to the SOS in secure mode can also be cited.

The screen 3 being designed to display a set of information edited by the operating system 10, the OOS has a display driver 13 resident in memory 7. Normally, such a display driver is configured to order the information in a display video memory 34, the periodic scanning of which transfers the information onto the screen 3 like a mirror.

An advantageous mechanism for implementing the security display device according to an embodiment of the invention prevents direct access of the OOS to the real video memory 34. The display driver 13 is then configured so that the information edited by the OOS is sent into a virtual video memory (VVM) 28.

The virtual video memory 28 is then used at the input of a filter arranged to allocate, independently of the open operating system, a first zone 3a of the screen to the first set of information edited by the open operating system. The filter makes it possible to allocate a second zone 3b of the screen to a second set of information edited by the secure operating system.

The filter can be produced in various ways. By way of illustration, the use of a direct memory access mechanism 30 (DMA, standing for Direct Memory Access) accelerates the transfer from the virtual video memory 28 to the screen, passing through the real video memory 34. Other ways of implementing the filter will be disclosed later in the description.

A command 36 of the DMA under the control of the SOS makes it possible to arrange the real video memory 34 so as to transfer the two sets of information to the screen under the exclusive control of the secure operating system. In this way a secure display of the second set of information is produced since, the second zone 3b being inaccessible to the OOS, no application executable by means of the OOS can introduce false information therein.

With reference to FIG. 3, the protection of the display device results from the combination of the virtual video memory 28, the filter associating the dedicated circuit 33 with a direct memory access in memory 28 and the real virtual memory 34, which each constitute a hardware component arranged to isolate the open operating system in terms of direct access to the screen 3 by means of the secure operating system. This embodiment offers a better degree of confidence that the one naturally granted to a logical implementation since no breakdown, no software intrusion can enable a malevolent application in the open world to access the protected zone of the screen.

In a case of the alternative previously disclosed where a mechanism of the ring protection type or by MMU is involved, it is possible to conceive an embodiment of the filter in software form in a layer with a high degree of protection of the ring structure or MMU control. Associated or not with the management of the keypad, the SOS for example allocates the various zones by translation of addresses.

It will be noted in FIG. 1 that the second zone is represented by a banner situated at the bottom of the screen 3, which constitutes a first position easily identifiable by a user. If the screen is a line by line reproduction of the memory 34, the SOS controls the DMA so as to copy the information extracted from the memory 25 at addresses at the head of the memory 34 and the information signalling the secure or non-secure mode at addresses at the tail of the memory 34. By virtue of the device disclosed above, it will be understood that the SOS can requisition other zones inside the one normally attributed to the OOS, for example in order to overlay a secret code entry window, naturally when the SOS instructs that secure mode should be displayed so as to remove any ambiguity on the confidence to be granted to the entry window.

In order to permute alternately the first position with a second position previously covered by the first zone, it suffices for the SOS to simply modify the addresses of the memory 34 into which it will transfer the information edited by the OOS and that edited by the SOS. When the zone 3b passes from the bottom of the screen to the top of the screen, the zone 3a is shifted downwards and vice versa. The permutation frequency is sufficiently low not to disturb the user. Advantageously the permutation frequency can be parameterized with the possibility of being embellished with a random or pseudo-random component and/or a detection of user activity so as to fix a positioning during the interaction of the user with any one of the zones of the screen. The touch pad is sampled in the form of measurements by the operating system, which establishes a match with a pressed or touched region of the screen. This makes it possible for example to associate a command with an image or to recognize a manuscript signature traced by the user on the screen. This place is identified firstly by the coordinates of the pressure detected on the screen, that is to say on the touch pad, and secondly by the coordinates of the image on the screen, that is to say more exactly in the first zone attributed to the OOS. A movement of the first zone on the screen causes a translation of the real coordinates of the image. In order to put the coordinates of the image in agreement with those of the pressure point, the device is arranged to translate the coordinates of the pressure point according to the position of the first zone so as to restore the match of the pressure point with the image that suits.

The mechanism that has just been described shows an additional advantage of a display of the second zone by superimposition on the first zone. The virtual coordinates, that is to say the coordinates as seen by the operating system, being by virtue of the display by superimposition the same as the real display coordinates on the screen, it is no longer necessary to use a complicated mechanism for restoring the match of the pressure point on a touch screen with the image that suits.

Figure 4:
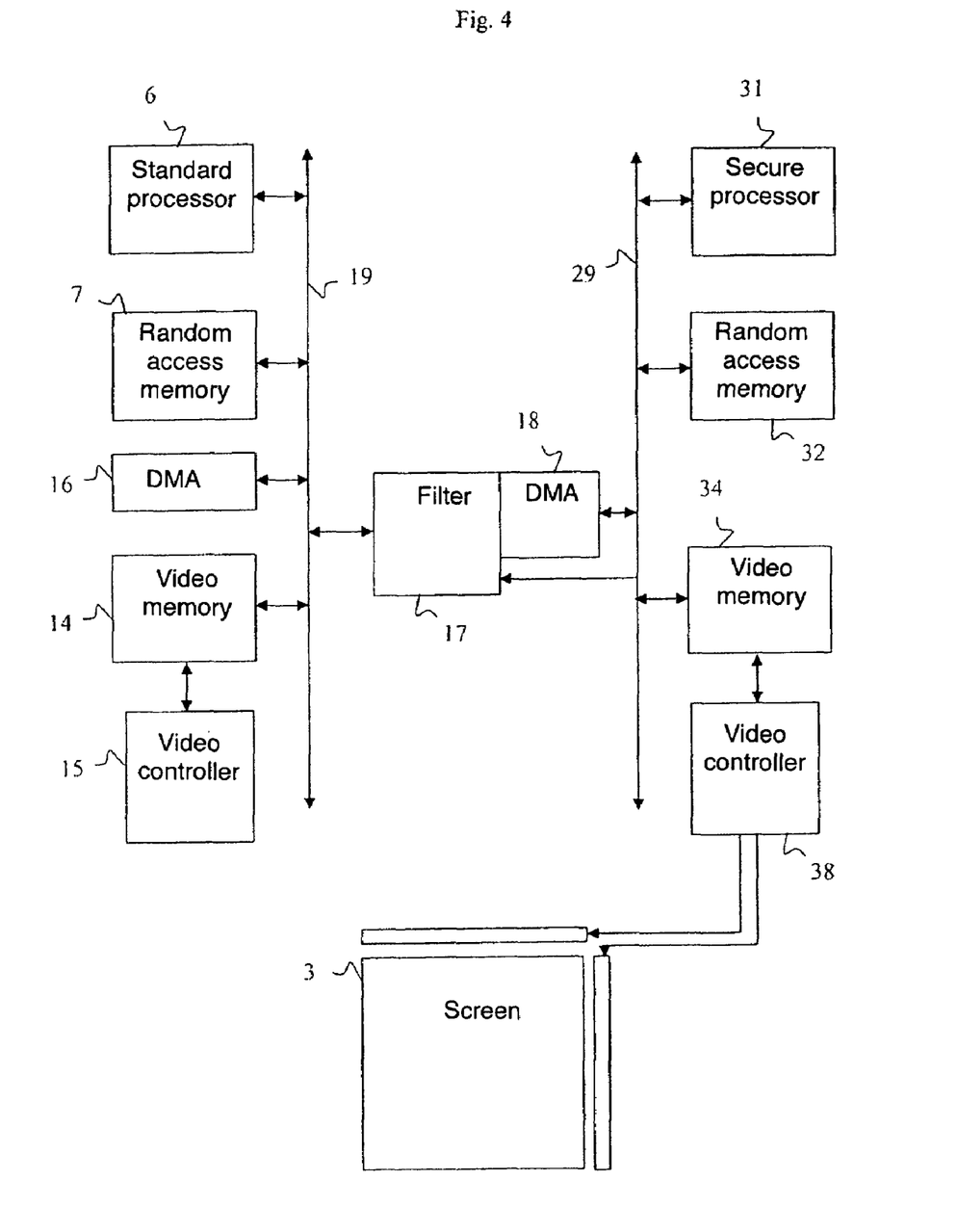
FIG. 4 depicts a second diagram of a device according to an embodiment of the invention.

With reference to FIG. 4, the device comprises a first standard component in which the standard processor 6 is connected to the memory 7 by a system bus 19. A DMA element 16 connected to the bus 19 makes it possible to make transfers from the memory 7 to a video memory 14, also connected to the bus 19. Moreover the video memory 14 is connected to a video controller 15 normally provided for being connected to a screen. The standard processor 6 is provided for executing an open operating system.

The device also comprises a second component similar to the previous one and in which a bus 29 connects a random access memory 32 to a video memory 34 that is connected to a video controller 38. Unlike the first component, it is a secure processor 31 that is connected to the bus 29. It is possible to choose from several means for protecting a processor or combining all or some of these various means. A first means consists of designing the processor itself with an architecture of the proprietor type. A second means consists of protecting the whole of the second component in a box physically resistant to intrusions or capable of detecting them and if necessary making a suitable response to them. A third means consists of providing the processor with a secure operating system as defined previously.

In the implementation explained with reference to FIG. 4, the video controller 38 controls the whole of the screen 3 by transmitting to it in a known manner a clock signal for synchronization, a frame signal and a pixel signal in a frame which codes the light and/or color components. A filter 17 is connected firstly to the bus 19 and secondly to the bus 29. The DMA element 16 is parameterized so as to transfer the video data to the filter 17 instead of transferring them to the video memory 14. The filter 17 is controlled by the processor 31 (a control represented by the arrow in a single direction going from the bus 29 to the filter 17) so as to combine the video data generated under the control of the open operating system with the video data generated under the control of the secure operating system. The video data generated under the control of the open operating system are those coming from the bus 19 and the video data generated under the control of the secure operating system are those coming from the bus 29. According to the variant adopted among those previously disposed, the combination can consist of:

attributing distinct display coordinates X, Y to the two types of video data (coming from the bus 19 and coming from the bus 29), in a fixed or movable fashion;

sharing certain display coordinates X,Y for at least some of the two types of video data by mixing the signals, for example by adding them so as to create a transparent overlap effect, here also in a fixed or movable fashion.

As the video data are gradually combined, the filter 17 transmits them to the video memory 34 via the bus 29. So as to improve the fluidity of the image and to relieve the processor 31, a DMA element 18 is parameterised so as to transfer to the filter 17 the video data coming from the memory 32 or directly from the processor 31 and to transfer to the memory 34 the video data combined by the filter 17.

Figure 5:
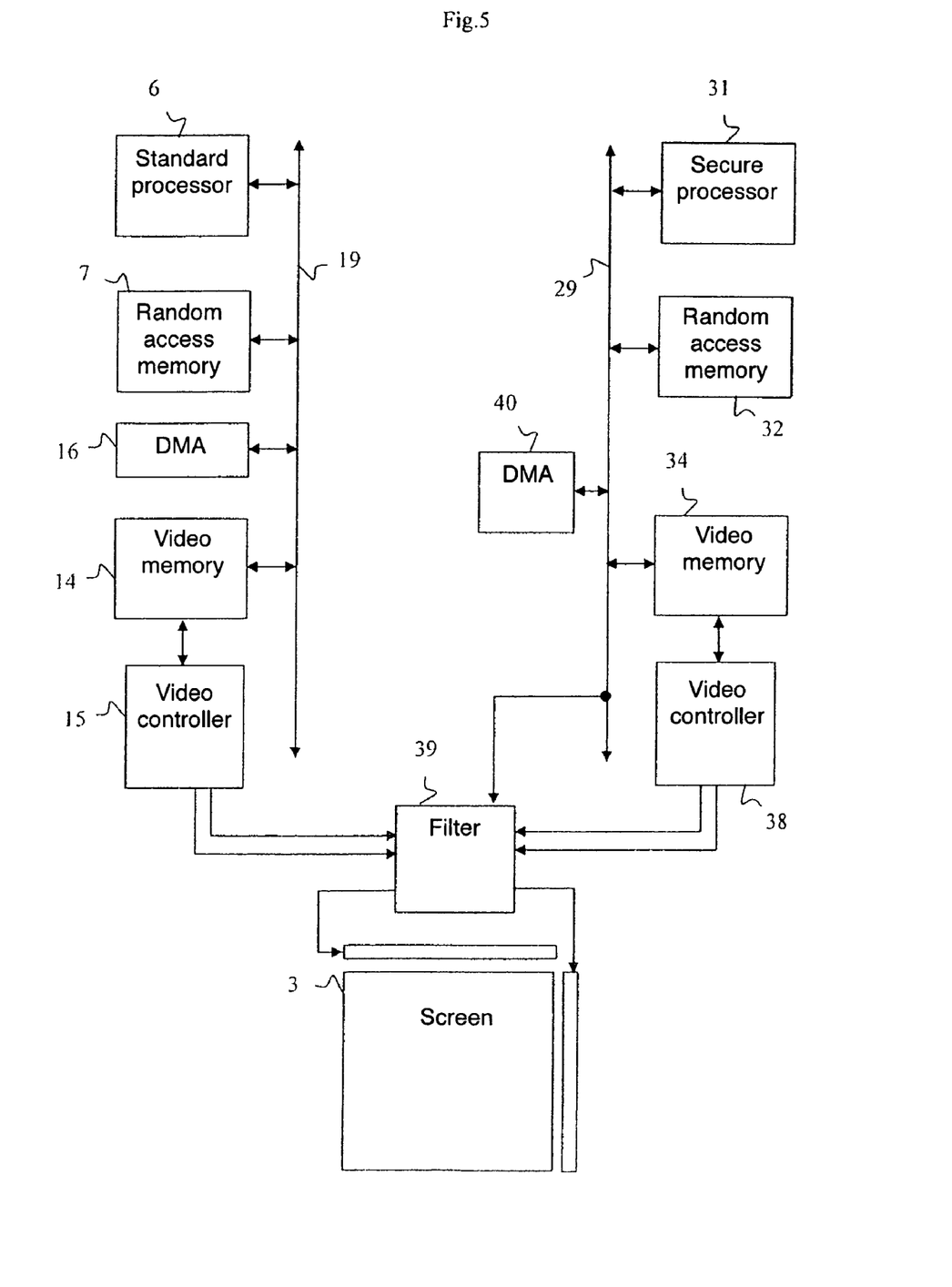
FIG. 5 depicts a third diagram of a device according to an embodiment of the invention.

In the implementation explained with reference to FIG. 5, the signals generated by the video controller 38 are rerouted to a filter 39. Likewise the signals generated by the video controller 15 are rerouted to the filter 39. The DMA element 16 is parameterized in a standard fashion so as to transfer the video data to the video memory 14. The filter 39 is controlled by the processor 31 (a control represented by the arrow in a single direction going from the bus 29 to the filter 39) so as to combine video signals generated under the control of the open operating system with video signals generated under the control of the secure operating system. The video signals generated under the control of the open operating system are those coming from the video controller 15 and the video signals generated under the control of the secure operating system are those coming from the video controller 38. According to the variant adopted among those previously disclosed, the combination can consist of:

acting on the clock signal in a constant or variable manner so as to switch the two types of video signal (coming from the controller 15 and coming from the controller 38) to distinct parts of the screen 3;

for each of all or some of the pixels of the screen 3, mixing the signals, for example by adding them so as to create a transparent overlap effect. The mobility of the pictogram or of the security banner and the positioning of a security entry window can then be fully managed by an application under the control of the SOS by displaying its image on a neutral background, the two operating systems having available all the display surface.

As the video signals are gradually combined, the filter 39 transmits them to the screen 3 just as a video controller would have done. This implementation makes it possible to exploit all the display functionalities of the first component such as for example graphical acceleration or 3D display functionalities provided as a basic thing in tandem with the video controller 15 in many commercially available components.

In terms of putting into industrial production, the possibility offered by an embodiment of the invention of reconciling the user friendliness of numerous items of information processing equipment produced on a large scale with the robustness required for secure processing of sensitive information will be appreciated.

An aspect of the disclosure provides a display method that allies ergonomics and security in the presentation of information.

Naturally, the present invention is not limited to the examples and embodiments described and depicted but is capable of many variants accessible to persons skilled in the art. Although the present disclosure has been described with reference to one or more examples, workers skilled in the art will recognize that changes may be made in form and detail without departing from the scope of the disclosure and/or the appended claims.

What is claimed is:

1. Method of secure display on a screen, comprising:
a step of receiving a first set of information edited by a first operating system, said first operating system being an unsecured operating system;
a filtering step in which an element allocates, independently of the first operating system, a first zone of the screen to the first set of information and a second zone of the screen to a second set of information edited by a second operating system which is secure; and
a real display step in which the two sets of information are transferred to the screen under sole control of the second secured operating system so as to produce a secure display of the second set of information.

2. Display method according to claim 1, wherein the method comprises a virtual display step in which the first set of information is written in a virtual video memory under control of the first operating system and wherein content of the virtual video memory is accessible to the second operating system.

3. Display method according to claim 1, wherein the method comprises a virtual display step in which the first set of information is written in a real video memory under control of the first operating system so as to be able to combine first video signals that result therefrom with second video signals that result from the second set of information under the control of the second operating system.

4. Display method according to claim 1, wherein the second zone is situated on the screen at a first position easily identifiable by a user.

5. Display method according to claim 4, wherein said first position is alternately permuted with a second position previously covered by the first zone.

6. Display method according to claim 1, wherein the second zone is superimposed with or without transparency on the first zone at one or more positions in the screen.

7. Display method according to claim 6, wherein at least one of said positions is moving on the screen.

8. Device for securely displaying datasets on a screen, wherein said device comprises:
a filter comprising:
an input for receiving a first data set edited by a first operating system, which is an unsecured operating system, and a second data set edited by a second operating system, which is a secured operating system;

an allocator configured for allocating:
   a first area of said screen to said first dataset, independently of said unsecured operating system, and
   a second area of said screen to said second dataset; and
an element configured to transfer said first dataset and said second dataset to the screen under the exclusive control of said second operating system, in order to produce a secured display of said second dataset.

9. Display device according to claim 8, wherein the filter comprises at an input thereof a virtual video memory arranged to receive the first set of information under control of the first operating system and at an output thereof a real video memory for combining the two sets of information.

10. Display device according to claim 8, wherein the filter is arranged to receive first video data generated by a standard processor and second video data generated by a secure processor, and for transferring into video memory a combination of the first and second video data.

11. Display device according to claim 8, wherein the filter is arranged to receive first video signals coming from a first video controller and second video signals coming from a second video controller, and to transfer onto the screen a combination of the first and second video signals.

12. Display device according to claim 8, wherein the filter is arranged to place the second zone on the screen at a first position easily identifiable by a user.

13. Display device according to claim 12, wherein the filter is arranged to permute said first position alternately with a second position previously covered by the first zone.

14. Display device according to claim 8, wherein the filter is arranged to superimpose the second zone on the first zone, with or without transparency, at one or more positions on the screen.

15. Display device according to claim 14, wherein the filter is arranged to make at least one of said positions move on the screen.

\* \* \* \* \*